United States Patent [19]

Washington

[11] Patent Number: 4,688,188
[45] Date of Patent: Aug. 18, 1987

[54] DATA STORAGE APPARATUS FOR STORING GROUPS OF DATA WITH READ AND WRITE REQUEST DETECTION

[75] Inventor: Ivan G. Washington, Stockport, Great Britain

[73] Assignee: International Computers Limited, London, England

[21] Appl. No.: 681,664

[22] Filed: Dec. 14, 1984

[30] Foreign Application Priority Data

Jan. 24, 1984 [GB] United Kingdom ............... 8401804

[51] Int. Cl.⁴ .......................... G06F 7/00; G11C 7/00
[52] U.S. Cl. .................................................. 364/900
[58] Field of Search ................................ 364/200, 900

[56] References Cited

U.S. PATENT DOCUMENTS

| | | | |
|---|---|---|---|
| 3,449,724 | 6/1969 | Boland et al. | 364/200 |
| 3,949,379 | 4/1976 | Ball | 364/200 |
| 3,997,875 | 12/1976 | Broeren | 364/200 |
| 4,183,058 | 1/1980 | Taylor | 358/127 |
| 4,317,168 | 2/1982 | Messina et al. | 364/200 |
| 4,344,156 | 8/1982 | Eaton et al. | 365/203 |
| 4,394,733 | 7/1983 | Swenson | 364/200 |
| 4,426,681 | 1/1984 | Bacot et al. | 364/200 |
| 4,530,055 | 7/1985 | Hamstra et al. | 364/200 |
| 4,602,353 | 7/1986 | Wawersig et al. | 365/189 |
| 4,603,403 | 7/1986 | Toda | 365/189 |

*Primary Examiner*—Archie E. Williams, Jr.
*Assistant Examiner*—Lawrence E. Anderson
*Attorney, Agent, or Firm*—Lee, Smith & Zickert

[57] ABSTRACT

A data storage apparatus uses a store having a nibble mode facility which allows two words to be accessed in a single extended cycle. Store access requests are held in a first-in-first-out queue in a buffer. When processing strings of data, double-read requests are alternated with pairs of write requests. A read request may be incorrectly aligned i.e. it may occur between a related pair of write requests. When an incorrectly aligned read request is detected, it is given priority so that it is executed ahead of its normal turn, and is then skipped when it is encountered during normal sequential read-out from the buffer. This allows the pair of write requests to be grouped together for execution in a single extended cycle.

5 Claims, 5 Drawing Figures

_4,688,188_

DATA STORAGE APPARATUS FOR STORING GROUPS OF DATA WITH READ AND WRITE REQUEST DETECTION

This invention relates to data storage apparatus.

Data storage apparatus can conveniently be constructed using integrated circuit memory chips. Such chips are now available with a so-called "nibble" mode facility, which permits a group of two or more consecutive data items to be accessed in a single extended cycle, of total duration less than that required to access the data items individually. This allows a string of accesses to consecutive addresses in the store to be performed very rapidly.

When processing strings of data, it may be convenient to generate alternately (a) a double-read request and (b) a pair of write requests. Each double-read request relates to a pair of data items in the same group and can therefore be executed in a single extended cycle using the nibble mode. Similarly, when the requests are correctly aligned, each pair of write requests relates to a pair of data items in the same group and can therefore be executed in a single extended cycle. However, in practice, it is found that the read and write requests are not always correctly aligned; that is, the two data write requests relating to the same group may be separated by an incorrectly aligned read request. This prevents the two data write requests from being executed by a single nibble mode write; instead, they must be executed by two separate write operations, which takes longer and hence slows down the overall operation of the overall operation of the store.

The object of the invention is to overcome this problem.

SUMMARY OF THE INVENTION

According to the invention, there is provided data storage apparatus comprising a data store capable of accessing a group of two or more consecutive data items in a single extended cycle which is shorter than the time required to access each of those items individually, characterised by a buffer for receiving a series of requests for reading or writing data items from and to the store, the requests in the buffer being organised as a first-in-first-out queue, and a logic circuit for detecting an incorrectly aligned read request, that is, one which occurs between two write requests relating to data items in the same group, and for causing that read request to be executed out of turn, so as to allow the two write requests to be grouped together for execution in one of said extended cycles.

The use of a buffer is known as such, for smoothing out a flow of requests appearing at irregular intervals. However, the buffer in the present invention serves the novel purpose of allowing the order of execution of the requests to be adjusted so as to utilise the nibble mode facility of the store in the most effective manner.

BRIEF DESCRIPTION OF THE DRAWING

One embodiment of the invention will now be described by way of example with reference to the accompanying drawings.

DESCRIPTION OF THE EMBODIMENT OF THE INVENTION

Figure 1:
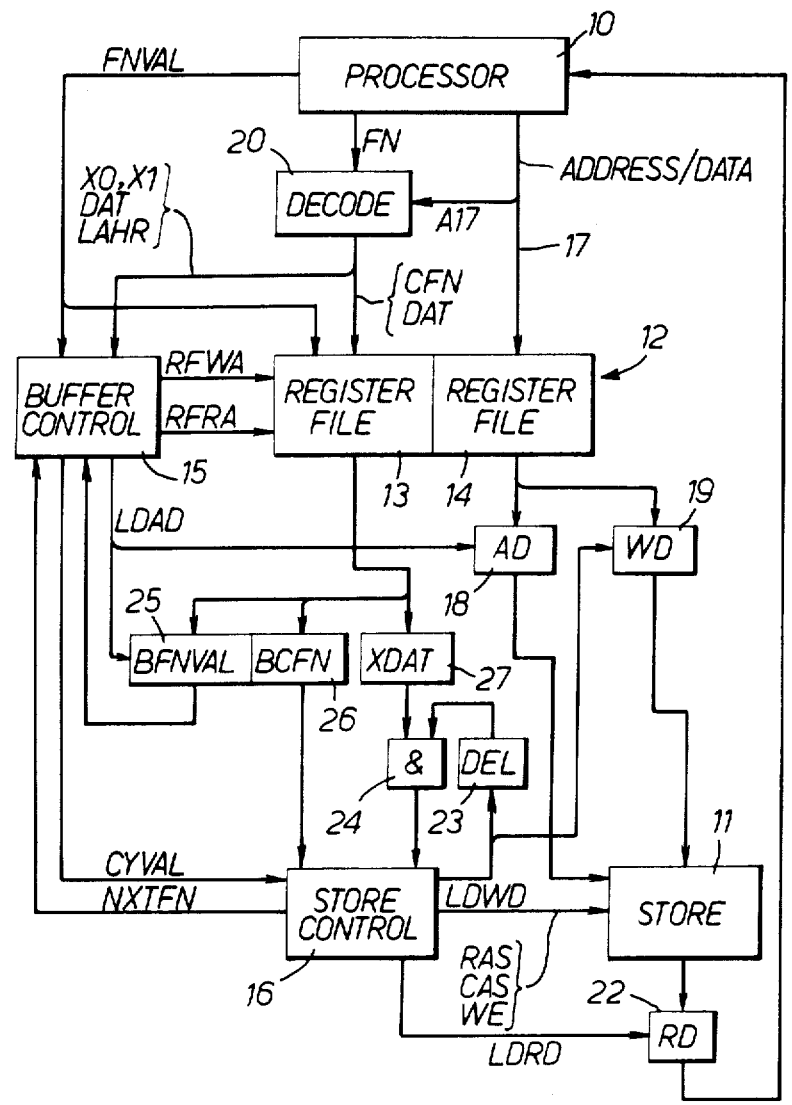
FIG. 1 is a block diagram of a data processing apparatus including a data store and a request buffer.

FIG. 1 shows data processing apparatus, comprising a data processing unit 10, a data store 11, and a request buffer unit 12. In operation, the processor 10 produces a series of store access requests. These requests are held in a queue in the buffer 12 and are executed when the store 11 becomes free.

As shown, the buffer 12 comprises two register files 13 and 14. Register files are standard components in the data processing field and so will not be described in detail. Briefly, however, each register file 13,14 consists of eight separate registers, with common data inputs and outputs. Writing and reading are independently controlled by separate write address and read address inputs, so that any one of the registers can be read while at the same time another is being written to. Each register file also has a write enable terminal; in the present system, this terminal is activated at each clock beat, unless the register file is full, so that the register file is written to at each clock beat.

A buffer control unit 15 produces a register file write address RFWA which is fed in parallel to the write address inputs of both register files 13,14. This address is incremented by one after each valid write to the buffer, so that successive inputs are stored in successive locations of the register files. In the case of an invalid or unwanted input, the address RFWA is not incremented, and so the invalid or unwanted information is overwritten at the next clock beat and is not retained in the buffer.

The buffer control unit 15 also produces a register file read address RFRA which is fed in parallel to the read address inputs of both register files 13,14. This address is normally incremented by one after each read from the buffer, so that the buffer normally acts as a first-in-first-out queue. However, as will be described, in certain circumstances a request may be read out from the buffer out of turn.

It should be noted that the read and write addresses for the register files are incremented cyclically; i.e. when the address reaches its maximum value (7), the next increment returns it to the lowest value (0).

Data store

The store 11 holds 262144 (=256K) individually addressable data words, each having an eighteen-bit address A–A17, and is controlled by a store control unit 16. The structure of the store and the store control unit form no part of the present invention and so they will not be described in detail. For example, the store may be constructed from large-scale integrated circuit (LSI) random-access memory (RAM) chips, and the store control may be a conventional microprogram control unit.

In a normal cycle of operation, a single data word is accessed in the store, either for reading or writing. However, the store is capable of operating in a nibble mode, in which a pair of words at consecutive addresses (i.e. an even word, with A17=0, followed by an odd word, with A17=1) is accessed in a single extended cycle.

Store Access Requests

Each request from the processor 10 consists of a function code FN along with the address A0–A17 of the data word it is required to access. In the case of a write request, this is followed at the next clock beat by the value of the data word to be written. The addresses and data are multiplexed on to the same path 17.

The address/data path 17 is connected directly to the data input of the register file 14. This register file therefore holds a queue of addresses and data in successive locations. The output of register file 14 is gated into an address (AD) register 18 if it is an address, by means of a signal LDAD from the buffer control unit 15. Alternatively, if it is a data word, the output of the register file 14 is gated into a write data (WD) register 19 by means of a signal LDWD from the store control unit 16. The AD register 18 is connected to the address input of the store 11, while the WD register 19 is connected to the data input.

The function code FN can specify a number of different functions, including the following.

R1: Read a single word from the store 11.

W1: Write a single word to the store.

R2L: Read a pair of words from the store, using nibble mode, with look ahead. "Look ahead" means that this function is to be given priority in certain circumstances, as will be explained.

WSY: Write one of a string of consecutive data words. If possible, pairs of WSY functions with corresponding even and odd addresses are to be grouped together to permit the even/odd pair of data words to be written together, using nibble mode.

The two functions R2L and WSY are intended to be used together for processing strings of data. During such string operations, the processor normally produces a repeated sequence of one R2L function followed by two WSY functions.

The function code FN is decoded by a decoder 20 to produce the following control signals.

CFN: This is a code which indicates whether the request is a read or write, and whether it is for a single word or a pair of words.

DAT: This indicates that the path 17 is carrying a data word, and is produced in the clock beat following a write function.

LAHR: This indicates that the function FN is a look-ahead ahead read (R2L).

In addition, decoder 20 uses the function code FN and the least significant address bit A17 to produce two control signals X0, X1 which indicate how many data words are expected, as follows.

X=0, X1=0 indicates that this is a read function and hence no data is expected.

X=1, X1=0 indicates that this is an ordinary write function (i.e. not WSY) and hence only one data word is expected.

X0=1, X1=1 indicates that this is a string write (WSY) with an even address (A17=0) and hence two data words are expected to make up an even/odd word pair.

X0=0, X1=1 indicates that this is a string write (WSY) with an odd address (A17=1), so that only one more data word is expected to make up the pair.

It can be seen that if either of X0,X1 is true, then at least one data word is expected.

The processor 10 also supplies a signal FNVAL to confirm that the function FN is valid, and that path 17 is carrying an address.

The signals X0,X1, DAT, LAHR and FNVAL are fed to the buffer control unit 15, to control the operation of the buffer 12. In addition, the signals FNVAL, CFN and DAT form a control tag which is fed to the input of the register file 13. This register file holds a queue of control tags, at locations corresponding to the related addresses and data in the register file 14.

At the output of the register file 13, the signals FNVAL, CFN and DAT are fed to three registers 25,26,27, the contents of which are referred to as BFNVAL, BCFN and XDAT respectively. Registers 25 and 26 are clocked by the signal LDAD from the buffer control unit 15, while register 27 is clocked at each clock beat.

The signal BCFN specifies the type of cycle to be performed by the store 11 (read/write; one word/two words). It is fed to the store control unit 16 so as to request the appropriate store cycle. The signal BFNVAL is fed to the buffer control 15 to inform it that a valid request has been read out of the buffer. The purpose of XDAT will be explained below.

Store control

The store control unit 16 produces a number of control signals for the store 11. These include the following.

RAS (Row address strobe). This loads a row address register within the store 11.

CAS (Column address strobe). This loads a column address register in the store.

LDRD (Load read data). This causes the contents of the currently addressed location of the store to be gated into a read data register 22. The contents of this register are returned to the processor 10.

LDWD (Load write data). This causes a data word to be read into the write data register 19 from the register file 14.

WE (Write enable). This causes the data in the WD register 19 to be written into the currently addressed location of the store 11.

NXTFN (Next function). This calls the buffer control unit 15 to supply the next request from the buffer 12 for execution.

The nibble mode mentioned above is produced by the control 16 by activating CAS for a second time in the cycle. This causes an internal pointer within the store 11 to be incremented from an even address to an odd address.

Each cycle of the store is initiated by a signal CYVAL (cycle valid) from the buffer control unit 15.

As shown in FIG. 1, the LDWD signal is also applied to a delay circuit 23, which delays it by one clock beat. The output of this circuit is fed to an AND gate 24 along with the signal XDAT from the register 27. Thus, the AND gate 24 is enabled if the present output of the register file 14 is a data word, and the previous output was also a data word. This will be the case only if the output of the register file 14 is the second word of an even/odd pair. The output of the AND gate 24 is fed to the store control 16, and forces the store control to change from a single-word write cycle to a double-word write. This causes the two words to be written in a single extended cycle (using nibble mode). During this extended cycle, LDWD is produced for a second time, so as to read the second data word from the register file 14 into the WD register 19.

Buffer control unit

The buffer control unit 15 will now be described in detail with reference to FIGS. 2-5.

Figure 2:
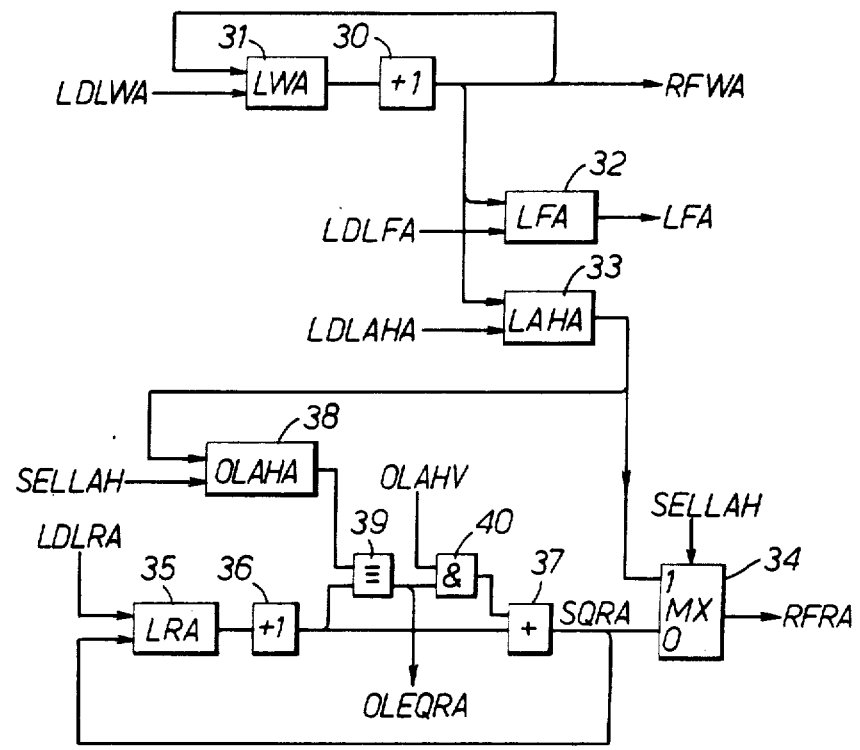
FIG. 2 is a logic diagram of a circuit for producing register file adresses for the request buffer.

FIG. 2 shows the way in which the register file addresses RFWA and RFRA are produced. The write address RFWA is obtained from an incrementer circuit 30 which adds one to the contents of a register 31 holding the previous value of RFWA. This previous value is referred to as LWA (last write address). A signal LDLWA loads the current value of RFWA into the LWA register 31, and hence increments the value of RFWA by one.

Whenever a request (other than an incorrectly aligned look-ahead read R2L) is written into the buffer, its location in the buffer is remembered by gating the current value of RFWA into a register 32. The contents of this register are referred to as LFA (last function address) and loading of this register is controlled by a signal LDLFA. In the case of an incorrectly aligned look-ahead read request R2L, the current value of RFWA is remembered in a register 33 instead of register 32. The contents of this register 33 are referred to as LAHA (look-ahead address) and it is controlled by a signal LDLAHA.

The read address RFRA is obtained from a multiplexer 34, which selects one of two sources, according to the value of a control signal SELLAH (select look-ahead). Normally SELLAH=0, and in this case the multiplexer 34 selects a value SQRA (sequential read address), which is obtained from a register 35 by way of an incrementer 36 and an adder 37. The contents of register 35 are referred to as LRA (last read address), and it can be loaded with the current value of SQRA by a signal LDLRA. Normally, the adder 37 adds zero, so that each LDLRA causes the value of SQRA to be incremented by one. Thus, it can be seen that when SELLAH=0, the contents of the buffer are read out consecutively, i.e. the buffer operates as a first-in-first-out queue.

When SELLAH=1, the multiplexer 34 is switches so as to select the contents of the LAHA register 33. Thus, the next request to be read out of the buffer will be the look-ahead read request, whose address was previously remembered in LAHA. The look-ahead request will therefore be executed out of the normal first-in-first-out sequence, being given priority over any other requests in the buffer.

Since the look-ahead request has been executed out of turn, it must be skipped when it is subsequently encountered during normal sequential reading. For this reason, SELLAH also causes the contents of the LAHA register 33 to be loaded into a register 38, referred to as the OLAHA (old look-ahead address) register, to remember it as the address of a location which has to be skipped. The contents of the OLAHA register 38 are continuously compared with LRA+1 from the incrementer 36, by means of a comparator 39, to produce a signal OLEQRA when they are equal. Provided a signal OLAHV is true, an AND gate 40 is enabled, and this causes the adder 37 to add an extra one to LRA, so that SQRA now becomes equal to LRA+2. This achieves the desired skipping of the location pointed to by LAHA.

The values of LWA and LRA are continuously compared by a comparator (not shown) so as to detect the situation where the buffer is completely full. In that case, further writing to the buffer is suppressed until one or more requests have been read out, freeing some space in the buffer. Extension bits to the register file addresses are used to distinguish between the completely full and completely empty conditions.

Writing to the buffer

Figure 3:
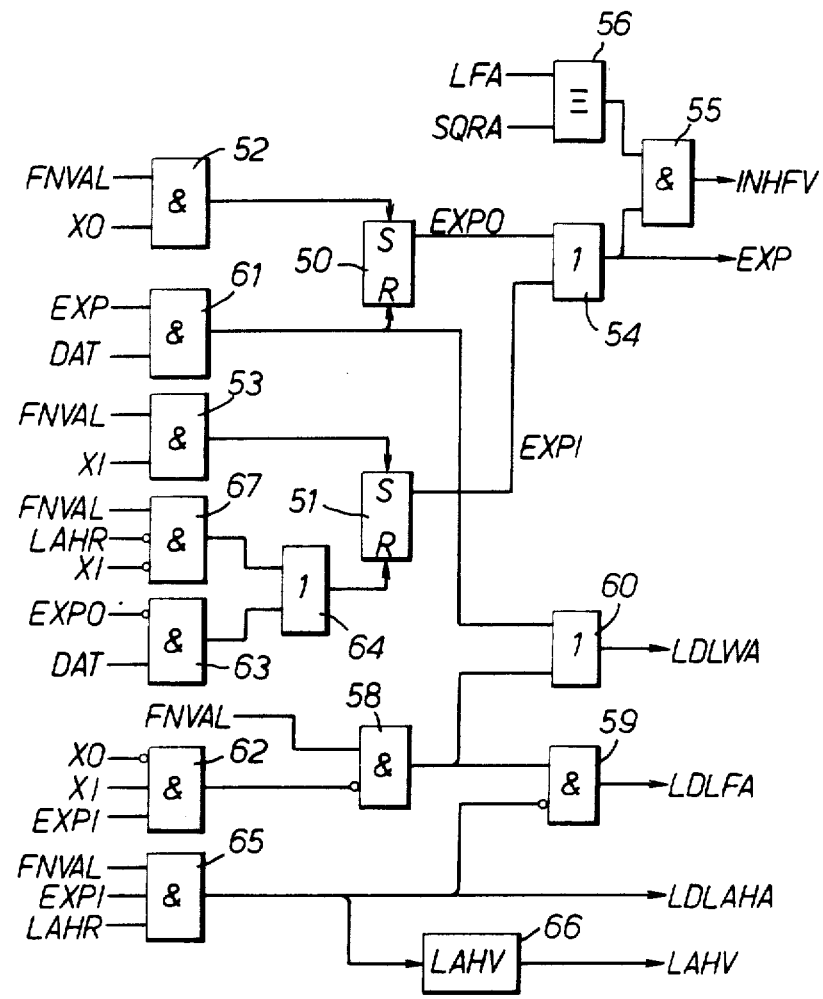
FIG. 3 is a logic diagram of a circuit for producing control signals for the register file addressing circuit.

FIG. 3 shows the way in which the signals LDLWA, LDLFA and LDLAHA (FIG. 2) are produced.

The buffer control unit 15 contains two bistables (flip-flops) 50,51 which produce output signals EXP0 and EXP1 respectively. These are used to store the control signals X0 and X1 from the decoder 20 (FIG. 1). Bistable 50 is set by an AND gate 52 when X0=1 and FNVAL=1, and bistable 51 is set by an AND gate 53 when X1=1 and FNVAL=1.

The signals EXP0 and EXP1 are combined in an OR gate 54 to produce a signal EXP which indicates that at least one of the two bistables is set; in other words, EXP indicates that at least one data word is expected. The signal EXP is in turn combined in an AND gate 55 with the output of a comparator 56, which compares LFA and SQRA. The output of the AND gate 55 is a signal INHFV which indicates that the request pointed to by SQRA does not yet have all its data present in the buffer. INHFV is used, as will be described, to prevent this request from being executed.

Consider the following sequence of requests:

| Function | Address/data |
|---|---|
| WSY | address (even) |
| — | data 0 |
| WSY | address (odd) |
| — | data 1 |
| R2L | address (even) |

It should be noted that in this sequence the WSY requests relate to an even/odd pair of addresses. Also, the R2L request is correctly aligned with the WSY requests.

When the first WSY function arrives, it is decoded to produce a control tag which is then written into the location of the register file 13 addressed by RFWA. The accompanying address is written into the corresponding location of register file 14. At the same time, the decoder 20 produces control signals X0=1 and X1=1 for the buffer control unit 15.

X0 and X1, along with FNVAL, set both the bistables 50,51 to indicate that two data words are expected. Also, FNVAL enables an AND gate 58 and another AND gate 59, to produce the signal LDLFA. This causes the value of RFWA to be written into the LFA register 32. The AND gate 58 also enables an OR gate 60, to produce the signal LDLWA which increments RFWA.

Now, when the first data word (data 0) arrives, it is written into the next location of the register file 14. At the same time, the control signal DAT, along with the signal EXP, enables an AND gate 61. This in turn enables the OR gate 60, so as to produce LDLWA which increments RFWA again. The AND gate 61 also resets the bistable 50, to indicate that one of the expected data words has arrived. This makes EXP0=0.

When the second WSY function and its accompanying address arrive, they are written into the buffer as before. Since this is an odd address, the decoder 20 produces the signals X0=0, X1=1. These signals, along with the signal EXP1, enable an AND gate 62, which inhibits the AND gate 58, preventing the production of LDLWA and LDLFA. Hence, RFWA is not incremented and so the contents of the currently addressed location of the register files will be overwritten by the next information received. Thus, the second WSY function and its address are not retained in the buffer; they are not needed since both data words will be written to the store 11 using nibble mode, which requires only the even address. This saves space in the buffer.

When the second data word (data 1) arrives, it is written into the addressed location of the register file 14. As before, the data is flagged by the control signal DAT, so that the AND gate 61 will again be enabled, producing LDLWA so as to increment RFWA. At the same time DAT and the inverse of EXP0 enable an AND gate 63. This in turn enables an OR gate 64 which resets the bistable 51 to indicate that both expected data words have now been received.

Normal write requests (i.e. those including functions other than WSY) are written into the buffer using the same mechanism. In this case, only bistable 50 is set, indicating that only a single data word is expected, and this is reset when the data word appears. RFWA is incremented after every normal write request, and again after receipt of the associated write data.

Read requests (including correctly aligned R2L requests) are also dealt with by the same mechanism. In this case, both X0 and X1 are zero, and hence neither of the bistables 50, 51 is set.

Consider now the following sequence of requests.

| Function | address/data |
|---|---|
| WSY | address (even) |
| — | data 0 |
| R2L | address (even) |
| WSY | address (odd) |
| — | data 1 |

In this case the look-ahead read function R2L is incorrectly aligned with the WSY functions, since it arrives before the second data word (data 1). In this situation, the R2L function is given priority over the WSY functions, as follows.

When the R2L function arrives, it is decoded by the decoder 20 to produce LAHR. The bistable 51 will still be set, since the second data word (data 1) for the WSY function has not yet arrived, so that EXP1=1. These two signals, along with FNVAL, enable an AND gate 65 to produce a signal LDLAHA. This inhibits the AND gate 59, preventing the production of LDLFA, and causes the value of RFWA to be remembered in the LAHA register 33 (FIG. 2). The signal LDLAHA also sets a bistable 66 for one beat, producing a signal LAHV (look-ahead valid). This activates logic, to be described later with reference to FIG. 5, which ensures that the next request to be executed will be that pointed to by the LAHA register 33. The look-ahead read request will therefore be executed out of turn, while the string write request (WSY) will have to wait until both the expected data words have arrived.

The effect of this is to ensure that the store 11 performs alternate double read and double write cycles, thereby maximising the efficiency of the store operation.

If at any time a non-string function arrives (i.e. any function other than WSY or R2L) the bistable 51 is immediately reset, by virtue of an AND gate 67 which is enabled by FNVAL, the inverse of LAHR, and the inverse of X1. This ensures that a data word not forming part of a string cannot be erroneously grouped with a word forming part of the string.

Reading from the buffer

Figure 4:
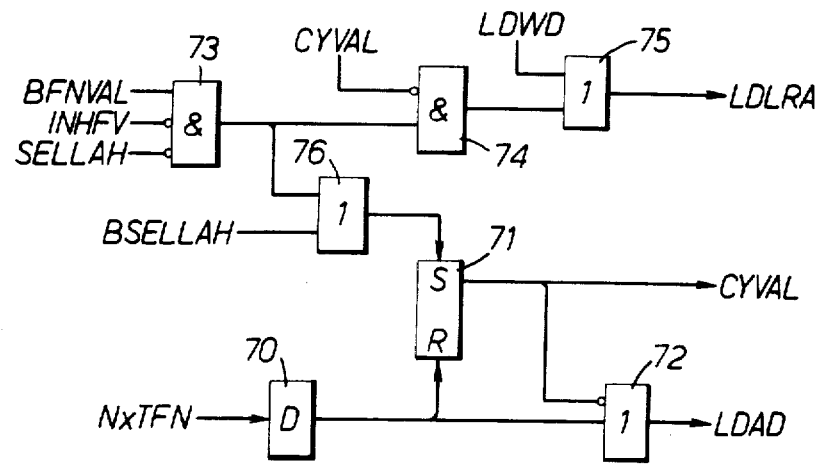

FIG. 4 shows the part of the buffer control unit 15 which controls the initiation of store cycles.

As mentioned above, when the store control 16 is ready to execute another request, it produces the signal NXTFN. This is staticised for one clock beat in a D-type bistable 70, which then resets a bistable 71, causing the CYVAL signal to be removed. The output of the bistable 70 is applied to an OR gate 72 which produces the signal LDAD. The OR gate 72 also receives the inverse of CYVAL, so that LDAD is maintained for as long as CYVAL is false.

As shown in FIG. 1, LDAD causes the locations in register files 13,14 currently addressed by RFRA to be gated into the registers 25, 26 and 18 respectively. If the output of the register files represents a valid function, the signal BFNVAL will be true.

As seen in FIG. 4, BFNVAL enables an AND gate 73. Since CYVAL is still false, this enables another AND gate 74 and an OR gate 75, producing the signal LDLRA. This increments the register file read address RFRA, so as to point to the next buffer location (which will either contain data if this is a write request, or will contain the next request). The output of the AND gate 73 also enables an OR gate 76 which sets the bistable 71. This restores CYVAL and starts the store access cycle.

If the cycle is a write cycle, then at the appropriate point the store control 16 produces LDWD, calling for the write data. LDWD causes the output of the register file 14 to be loaded into the WD register 19 (FIG. 1). Also, as seen in FIG. 4, LDWD enables the OR gate 75, so as to produce LDLRA which increments RFRA again.

It should be noted that the AND gate 73 is inhibited if either INHFV or SELLAH is true, preventing the initiation of the next cycle (via the OR gate 76) and preventing the incrementing of RFRA (via the AND gate 74). INHFV indicates that the current request is a string write function and is still waiting for at least one of its data words to be assembled in the buffer; SELLAH indicates that a look-ahead read is pending.

Look-ahead operation

As mentioned above, whenever a look-ahead read request is received while data is still expected for a previous string write request, the bistable 66 (FIG. 3) is set, producing the signal LAHV. This indicates that the lookahead read is to be executed next, out of turn. This is achieved as follows.

Figure 5:
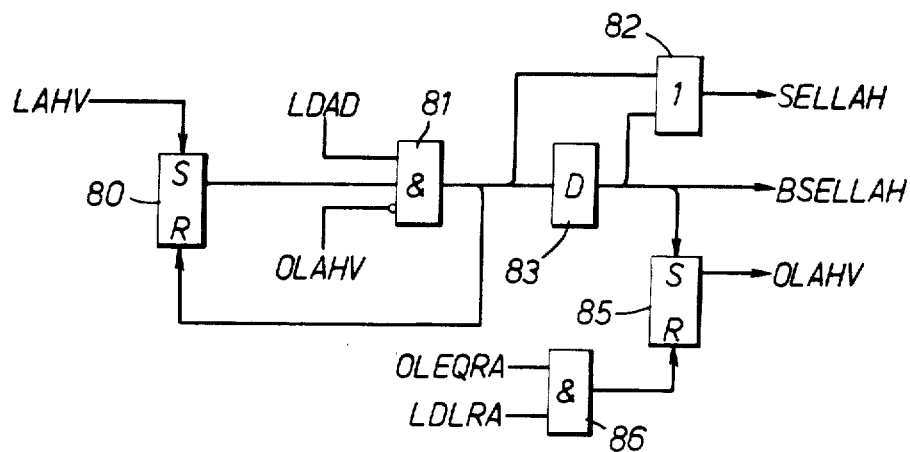

Referring to FIG. 5, the signal LAHV sets a bistable 80. When the signal NXTFN is received, LDAD is generated as described above, and this, in combination with the output of the bistable 80, enables an AND gate 81. This enables an OR gate 82 producing the signal SELLAH. This causes the multiplexer 34 (FIG. 2) to be switched, so as to address the register file by LAHA instead of SQRA. Thus, the look-ahead request is read out of the buffer before the request indicated by SQRA.

The output of the AND gate 81 also resets the bistable 80, and sets a D-type bistable 83 for one clock beat.

The bistable 83 produces a signal BSELLAH which does the following:

(a) It maintains SELLAH for another clock beat, by way of the OR gate 82.

(b) It sets a bistable 85, producing a signal OLAHV which indicates that the contents of the OLAHA register 38 (FIG. 2) are now valid.

(c) It enables the OR gate 76 (FIG. 4) so as to set the bistable 71. This restores CYVAL, so as to initiate the store access cycle.

The signal OLAHV enables the AND gate 40 (FIG. 2) so as to activate the mechanism described above for skipping over the old look-ahead request when it is encountered again during normal sequential reading of the buffer.

The signal OLAHV also inhibits the AND gate 81 so as to hold up any further look-ahead action until the previously executed look-ahead request has been skipped. The reason for this is that there is only one register 38 for storing old look-ahead addresses.

The bistable 85 is reset by an AND gate 86 which combines the signals OLEQRA and LDLRA. Thus, it can be seen that the bistable 85 is reset when the location indicated by OLAHA is skipped.

Summary

In summary, it can be seen that the buffer 12 holds a queue of requests from the processor 10 to the store 11. Normally, this is organised as a first-in-first-out queue.

When a pair of string write (WSY) requests are received, the control tag and address of the second of these requests is not retained in the buffer, by virtue of the action of the AND gate 62 (FIG. 3) which prevents the register file write address RFWA from being incremented. This saves space in the buffer, and groups the two data words together so that they can be written to the store as a pair, using the nibble mode facility. The nibble mode is activated by the AND gate 24 (FIG. 1) which detects the appearance of the two consecutive data words.

If a look-ahead read request (R2L) is received while the buffer contains a string write request (WSY) which is still awaiting at least one of its data words, this is detected by the AND gate 65, which initiates a look-ahead action. The look-ahead request is given priority, by means of the multiplexer 34 (FIG. 2) which selects the look-ahead address stored in the LAHA register 33 instead of the normal sequential read address SQRA. Thus, the look-ahead request is executed next, ahead of its normal turn.

The location of the look-ahead request is remembered in the OLAHA register 38 (FIG. 2) so that when it is encountered during subsequent normal sequential reading, it can be skipped.

It will be appreciated that many modifications may be made to the apparatus described above without departing from the scope of the invention.

For example, the store unit could be arranged to access more than two words in the nibble mode. Currently available RAM chips allow four consecutive locations to be accessed in each nibble mode operation. In order to use this full capability, the buffer could be modified to allow a group of four data words to be asembled when executing string write requests.

Another possible modification would be to construct the storage apparatus as a plurality of separate channels, each having a store unit and a request buffer. Such an arrangement would require a control unit to distribute the store access requests to the appropriate channels, according to the specified address.

What is claimed is:

1. Data storage apparatus comprising:
   (a) a data store for storing a plurality of groups of data items,
   (b) receiving means for receiving a series of requests for reading and writing individual data items from and to the data store,
   (c) a buffer for storing a plurality of said requests, the buffer having a data input connected to the receiving means, a data output connected to the data store, a write address input, and a read address input,
   (d) first addressing means coupled to the write address input of the buffer for producing a consecutive sequence of write addresses for writing said requests from the receiving means into the buffer in a predetermined order,
   (e) second addressing means coupled to the read address input of the buffer for producing a consecutive sequence of read addresses for reading said requests from the buffer in the same predetermined order,
   (f) detecting means, coupled to the receiving means, for detecting an incorrectly aligned read request, that is, one which occurs between two write requests relating to data items in the same group, and
   (g) look ahead means connected to the read address input of the buffer and responsive to said detecting means, upon detection of said incorrectly aligned read request, for reading that request out of the buffer ahead of its normal turn, that is, before the request currently indicated by the read address from the second addressing means.

2. Data storage apparatus according to claim 1 wherein each write request includes an address followed by a data value, and wherein the apparatus further includes means for detecting the occurrence of two consecutive write requests relating to data items in the same group, and means for preventing the address of the second of those two requests from being retained in the buffer, so that the two data values are written into consecutive locations of the buffer.

3. Data storage apparatus according to claim 2 further including means for detecting the reading of two data values from consecutive locations of the buffer and thereupon initiating an extended cycle of the store so as to write these two data values together in a single extended cycle.

4. A data processing system comprising
   (a) a data processing unit,
   (b) a data store, coupled to the data processing unit, for storing a plurality of groups of data items,
   (c) receiving means coupled to the data processing unit, for receiving a series of requests from the data processing unit for reading and writing individual data items from the data store,
   (d) a buffer for storing a plurality of said requests, the buffer having a data input connected to the receiving means, a data output connected to the data store, a write address input, and a read adress input,
   (e) first addressing means coupled to the write address input of the buffer for producing a consecutive sequence of write addressed for writing said requests from the receiving menas into the buffer in a predetermined order, (f) second addressing means coupled to the read address input of the buffer for producing a consecutive sequence of read addresses for reading said requests from the buffer in the same predetermined order, (g) detecting means, coupled to the receiving means, for detecting an incorrectly aligned read request, that is, one which occurs between two write requests relating to data items in the same group, and (h) look ahead means connected to the read address input of the buffer and responsive to said detecting means, upon detection of said incorrectly aligned read request, for reading that request out of the buffer ahead of its normal turn, that is, before the request currently indicated by the read address from the second addressing means.

5. Data storage apparatus comprising:

(a) a data store for storing a plurality of groups of data items, (b) receiving means for receiving a series of requests for reading and writing individual data items from and to the data store, (c) a buffer for storing a plurity of said requests, the buffer having a data input connected to the receiving means, a data output connected to the data store, a write address input, and a read address input, (d) first addressing means coupled to the write address input of the buffer for producing a consecutive sequence of write addresses for writing said requests from the receiving means into the buffer in a predetermined order, (e) second addressing means coupled to the read address input of the buffer for producing a consecutive sequence of read addresses for reading said requests from the buffer in the same predetermined order, (f) detecting means, coupled to the receiving means, for detecting an incorrectly aligned read request, that is, one which occurs between two write requests relating to data items in the same group, (g) look ahead means connected to the read address input of the buffer and responsive to said detecting means, upon detection of said incorrectly aligned read request, for reading that request out of the buffer ahead of its normal turn, that is, before the request currently indicated by the read address from the second addressing means, (h) register means coupled to the look-ahead means, for storing the address of a location in the buffer which holds an incorrectly aligned read request which has been executed ahead of its normal turn, (i) comparator means, connected to the register means and to the second addressing means, for comparing contents of the register means with each sequential read address produced by the second addressing means, and (j) means connected to the comparator means and operable when the comparator means detects equality, for incrementing said sequential read address produced by the second addressing means, thereby skipping over the incorrectly aligned read request when it is encountered during normal sequential read-out from the buffer.

* * * * *